United States Patent Office 3,706,729
Patented Dec. 19, 1972

3,706,729
ANTIBIOTICS AND PROCESSES FOR THEIR
PREPARATION
Andrew David Batcho, 98 Jackson Ave., North Plainfield, N.J. 07060; Julius Berger, 308 Aycrigg Ave., Passaic, N.J. 07055; Andre Furlenmeier, 119 Wettseinallee, Basel, Switzerland; Oscar Keller, 187 Rutherford Blvd., Clifton, N.J. 07014; Benjamin Pecherer, 24 Clairidge Court, Montclair, N.J. 07042; Arno Johannes Schocher, RD 2, Boonton Ave., Boonton, N.J. 07005; Hans Spiegelberg, 16 Im Holeeletten, Basel, Switzerland and Bruno Peter Vaterlaus, 14 Muhlesteig, Binningen, Switzerland
No Drawing. Filed Nov. 21, 1963, Ser. No. 325,498
Int. Cl. C07c 47/18
U.S. Cl. 260—210 R                         26 Claims

ABSTRACT OF THE DISCLOSURE

Novel antibiotics of the family coumermycin formerly called sugordomycins are prepared by cultivating the organism *Streptomyces hazeliensis* (NRRL 2938). The most active of the antibiotics is coumermycin $A_1$, which is of the Formula I hereafter.

This invention relates to new antibiotics and to methods for their production. More particularly, the invention relates to new antibiotics produced by cultures belonging to the genus Streptomyces.

The organism which produces the novel antibiotics of the invention is named *Streptomyces hazeliensis* var. *hazeliensis* nov. sp. This organism was isolated from a sample of soil obtained in Matane, Gaspé, Canada. The organism will be designated hereinafter as *Streptomyces hazeliensis* for purposes of brevity. A culture of *Streptomyces hazeliensis* has been deposited in the collection of microrganisms of the United States Department of Agriculture, Northern Utilization Research and Development Division, Peoria, Ill., under the Registration No. NRRL 2938.

The antibiotics of the invention are characterized by having a high activity against *Staphylococcus aureus*. Additionally, the antibiotics are active against a wide range of gram-positive bacteria, and gram-negative bacteria, e.g., against *A. aerogenes, Mycobacterium phlei, Proteus vulgaris, Sarcina lutea* PCI–1001, etc.

Accordingly, the antibiotics of the invention are useful in the treatment of bacterial infections, for example, those caused by *Staphylococcus aureus*. They can be administered by parenteral injection, e.g., in a parenterally acceptable vehicle, or orally.

The antibiotics of the invention have been named sugordomycins. The antibiotics of this invention have also been named coumermycins. The most active sugordomycin antibiotic against *Staphylococcus aureus* is (I) N, N'-bis{4 - hydroxy - 8 - methyl - 7 - [4-O-methyl-5,5-dimethyl - 3 - O - (5-methyl-2-pyrrolylcarbonyl)-α-L-lyxopyranosyloxy]-2-oxo-2H-1-benzopyran - 3 - yl} - 3-methyl - 2,4 - pyrroledicarboxamide. The last-mentioned substance is now also known as coumermycin $A_1$. This compound has the structural formula

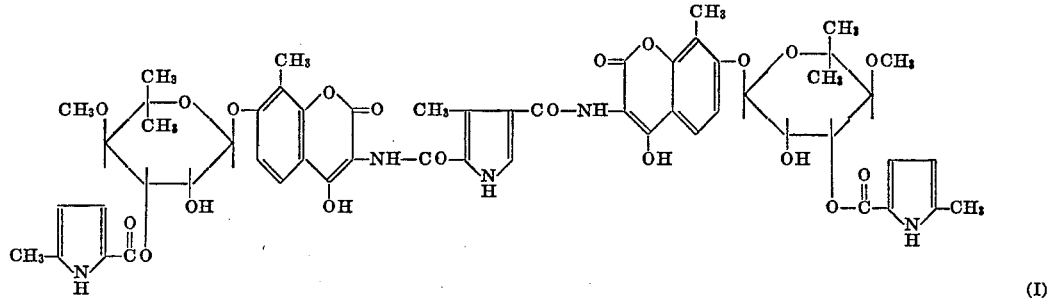

(I)

Other antibiotics within the scope of the invention include the following:

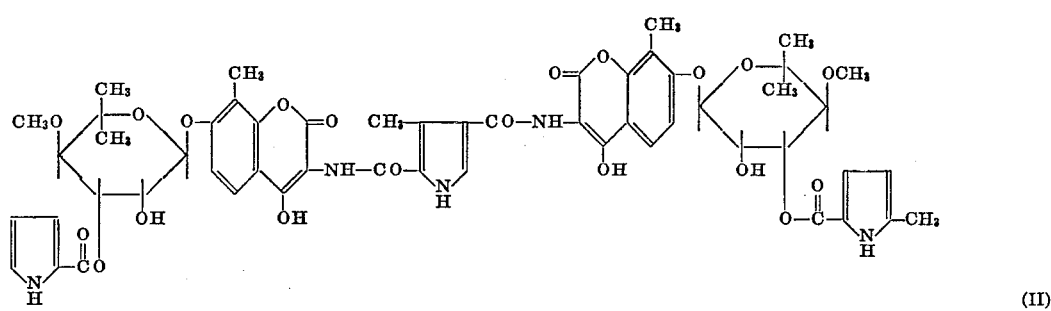

(II)

2N{4 - hydroxy - 8 - methyl - 7[4 - O-methyl-5,5-dimethyl - 3 - O(2 - pyrrolylcarbonyl)-α-L-lyxopyranosyloxy] - 2 - oxo - 2H - 1 - benzopyran - 3 - yl}-4N'- {4 - hydroxy - 8 - methyl - 7[4 - O-methyl - 5,5-dimethyl-3 - O(5 - methyl - 2 - pyrrolylcarbonyl)-α-L-lyxopyranosyloxy] - 2 - oxo - 2H - 1 - benzopyran - 3 - yl} - 3-methyl-2,4-pyrroledicarboxamide

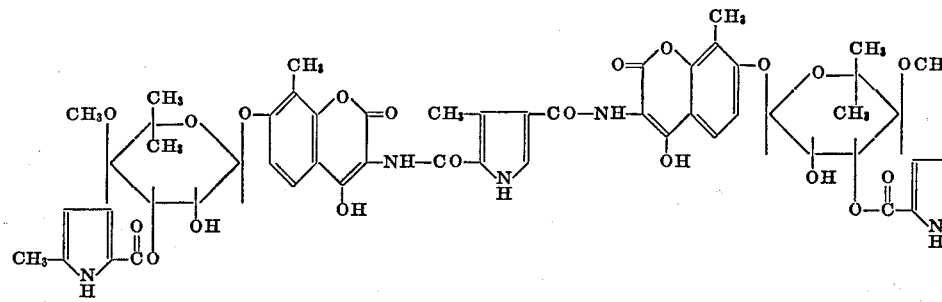

2N{4 - hydroxy - 8 - methyl - 7[4 - O-methyl-5,5-dimethyl - 3 - O(5 - methyl - 2 - pyrrolylcarbonyl)-α-L-lyxopyranosyloxy] - 2 - oxo - 2H - 1 - benzopyran-3-yl} - 4N' - {4 - hydroxy - 8 - methyl - 7[4 - O-methyl- 2N{4 - hydroxy - 8 - methyl - 7[4 - O-methyl - 5,5-dimethyl - 3 - O(5 - methyl - 2 - pyrrolylcarbonyl)-α-L-lyxopyranosyloxy] - 2 - oxo - 2H - 1 - benzopyran - 3-yl} - 4N' - {4 - hydroxy - 8 - methyl - 7[4 - O-methyl-5,5 - dimethyl-α-L-lyxopyranosyloxy] - 2 - oxo - 2H - 1-benzopyran - 3-yl} - 3-methyl-2,4-pyrroledicarboxamide (VI)

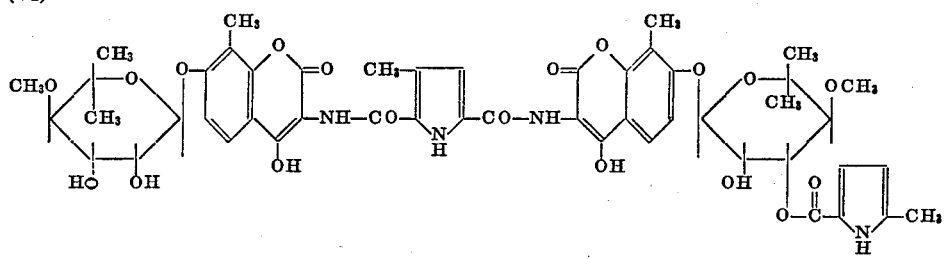

5,5 - dimethyl - 3 - O(2 - pyrrolylcarbonyl) α-L-lyxopyranosyloxy] - 2 - oxo - 2H - 1 - benzopyran - 3 - yl}-3-methyl-2,4-pyrroledicarboxamide 2N{4 - hydroxy - 8 - methyl - 7[4 - O - methyl - 5,5-dimethyl - α - L - lyxopyranosyloxy] - 2 - oxo - 2H-

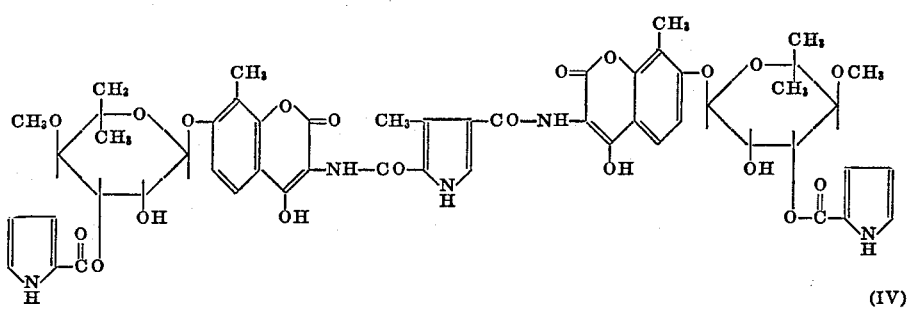

(IV)

N,N'-bis{4 - hydroxy - 8 - methyl - 7[4 - O-methyl-5,5-dimethyl - 3 - O(2 - pyrrolylcarbonyl)-α-L-lyxopyranosyloxy] - 2 - oxo - 2H - 1 - benzopyran - 3 - yl}-3-methyl-2,4-pyrroledicarboxamide 1 - benzopyran - 3 - yl} - 4N'{4 - hydroxy - 8 - methyl-7[4 - O - methyl - 5,5 - dimethyl - 3 - O(5 - methyl - 2-pyrrolylcarbonyl) - α - L - lyxopyranosyloxy] - 2 - oxo-

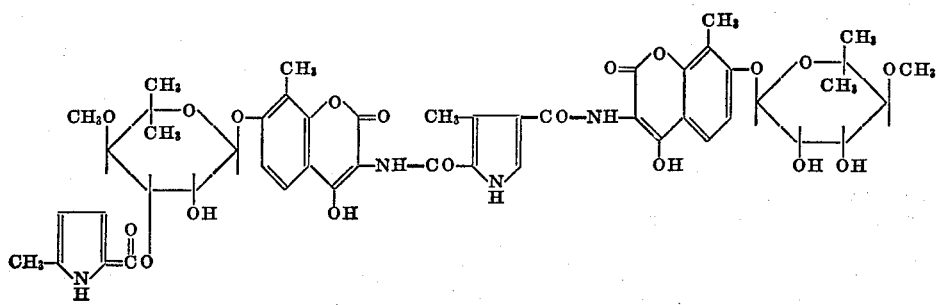

(V)

2H - 1 - benzopyran - 3 - yl} - 3 - methyl - 2,4 - pyrroledicarboxamide (VII)

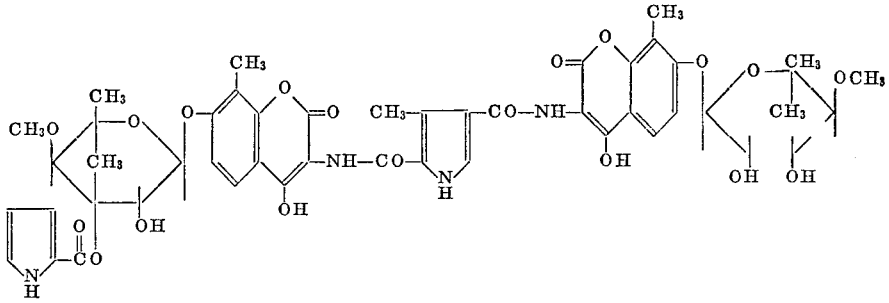

2N{4 - hydroxy - 8 - methyl - 7[4 - O - methyl - 5,5-dimethyl - 3 - O(2 - pyrrolylcarbonyl - α - L - lyxopyranosyloxy] - 2 - oxo - 2H - 1 - benzopyran - 3 - yl}-4N' - {4 - hydroxy - 8 - methyl - 7[4 - O - methyl - 5,5-dimethyl - α - L - lyxopyranosyloxy] - 2 - oxo - 2H - 1-benzopyran - 3 - yl} - 3 - methyl - 2,4 - pyrroledicarboxamide (VIII)

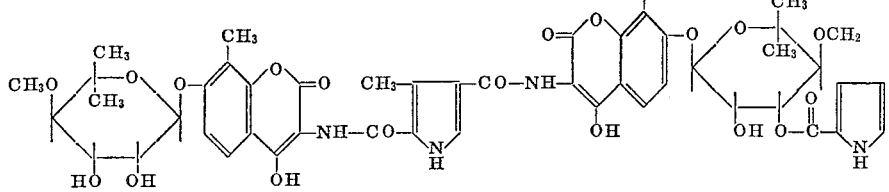

2N{4 - hydroxy - 8 - methyl - 7[4 - O - methyl - 5,5-dimethyl - α - L - lyxopyranosyloxy] - 2 - oxo - 2H - 1-benzopyran - 3 - yl} - 4N'{4 - hydroxy - 8 - methyl - 7 [4 - O - methyl - 5,5 - dimethyl - 3 - O(2 - pyrrolylcarbonyl) - α - L - lyxopyranosyloxy] - 2 - oxo - 2H - 1-benzopyran - 3 - yl} - 3 - methyl - 2,4 - pyrroledicarboxamide

*Streptomyces hazeliensis* is an aerobic and aerially sporulating member of the order Actinomycetales and belongs to the genus Streptomyces as described in Bergey's Manual of Determinative Bacteriology, 7tth edition, 1957. Although this organism may be considered related to *Streptomyces griseoflavus* strain No. 160, *Streptomyces niveus* NRRL 2446, *Streptomyces spheroides* NRRL 2449, Streptomyces No. 58383, *Streptomyces spirogriseus* NRRL 2590, and *Streptomyces griseus* ATCC 12,318, there are more than sufficient differences between the above organisms and *Streptomyces hazeliensis* to definitely determine that the latter is not the same species as any of the former. The differences in morphology and in spore color are clearly sufficient to differentiate *Streptomyces hazeliensis* from all of the antibiotic-producing Streptomyces according to the classification criteria of T. G. Pridham, C. W. Hesseltine and R. G. Benedict, Appl. Microbiology 6: 52–79 (1958). "A Guide for the Classification of Streptomyces According to Selected Groups."

Another conclusive differentiation lies in the difference between the antibiotics produced by *Streptomyces hazeliensis* and novobiocin produced by the above organisms.

Cultures of *Streptomyces hazeliensis* grown on favorable media, such as tomato-soy agar, at 28° C. for 2 to 10 days grow with an aerial mycelium which is generally white and becomes grey to grey-brown on sporulation. A colorless to yellow exudate is formed on various media. Sporophores on Bennett's and asparagine agar are mainly straight to flexuous, ending sometimes in a wide hook or loop, or in loose, open, characteristically wide (diameter 7μ) spirals with 1 to 5 loops, the spirals being quite irregular in shape and distance between the loops. The spores are oval to cylindrical, varying from 1 to 1.2μ wide x 1.4 to 2.4μ in length. No well-formed spirals were seen on either Czapek or yeast-malt agar media, but there were present small hooks or primitive spirals. Sometimes up to 5 sporophores arise from one point in a broomlike form. There are no ball-like, tight or compact spirals, thus differentiating the culture from *Streptomyces spheroides*. Although some clusters of sporophores do occur, they are not characteristically corkscrew-coiled at the tip, as they are for *Streptomyces niveus*. On the contrary, the coils of a sporophore of *Streptomyces hazeliensis* are bigger at the tip, wider and looser, becoming narrower and tighter at the point of attachment to the hypha.

To provide a basis for comparing *Streptomyces hazeliensis* with known Streptomyces described in classical complex nitrogenous media, as well as on chemically defined media [Pridham and Gottlieb, J. Bact. 56, 107–115 (1948)], both types of media were used. Media and procedures were adapted from those described above by Pridham and Gottlieb; Gottlieb D., Appl. Microbiology 9: 55–65 (1965); A Manual of Methods for Pure Culture Study of Bacteria by the Committee on Bacteriologic Technic of the Society of American Bacteriologists, 1948; and by Waksman, The Actinomycetes, (Chronica Botanica Co. 1950).

On Bennett's and Czapek's agars, all strains of *Streptomyces hazeliensis* grew abundantly at 22°, 28°, and 35° C., with better sporulation at the higher temperatures. On the other hand, *Streptomyces niveus* and *Streptomyces spheroides* grew well at the lower temperatures but not at all at 35° C. Streptomyces No. 160 and Streptomyces sp. No. 58383 also do not grow at 35° C.

The growth responses of *Streptomyces hazeliensis* on various media are described below. Common color names are given together with descriptions from Color Harmony Manual 4th edition, Container Corporation of America, Chicago, Illinois, 1958:

Sucrose-nitrate agar (Czapek sucrose): Growth, good, but no sporulation; aerial mycelium creamy colored (between hue 2 cc. and chm grey scale d). Reverse cream-brown; pigment creamy (hue ca. 2).

Glucose-asparagine agar: Growth abundant, slightly raised, smooth surface aerial mycelium light grey, with light grey spores. Reverse pale cream; no soluble pigment.

One strain shows tiny clear droplets of exudate at end of streaks.

Glucose-nutrient agar: Growth scarce, flat, leathery, with strong foldings into agar. Aerial growth white, reverse dark cream; soluble pigment brownish (hue 4 ne). *Streptomyces spheroides* gives moderate growth with no soluble pigment, while *Streptomyces niveus* gives good growth and soluble yellow pigment. Streptomyces sp. No. 58383 gives abundant growth, no soluble pigment.

Glucose-nutrient plus glycerol agar: Abundant growth, very deep folds into agar; surface wrinkled and cracked. Vegetative mycelium light tan, with some fairly large drops of light yellow colored exudate. Aerial growth partly white to greyish-brown (chm. near grey 5 dc), about 25 percent sporulated. Reverse coffee brown; soluble pigment light brown-yellow (hue 3 ie) to brown.

Amidex agar: Growth moderate to good, flat; aerial mycelium medium grey; reverse cream-brown to dark coffee brown. Soluble pigment red-brown (hue 4 pe-pg).

Totato paste-oatmeal agar: Growth heavy, with good sporulation; some exudate droplets. Aerial mycelium grey to grey-brown (chm near grey 5 fe). Reverse dark brownish olive with dirty olive soluble pigment.

Skim milk agar: Substrate growth good, pasty, smooth, with no aerial mycelium. Strong production of soluble dark brown pigment, light brown further away from the growth streaks (hue 5 n-i and hue 3 ie).

Peptone-iron agar: A few colonies only; smooth pasty, regularly ridged cone with bright white top. Aerial mycelium dark cream, top white. Soluble pigment dark brown (hue 4 pn).

Bennett's agar: Growth abundant, aerial mycelium grey with grey-brown (reddish) spores and production of droplets of pale yellow exudate. Reverse yellow-brown; soluble pigment light yellow-brown (hue 3 pc). A second strain gave no exudate, while a third gave a spreading yellow exudate which wetted the whole growth surface.

Potato plug: Growth scant after 2 weeks, but blackering of potato after only 4 days. On the other hand, *Streptomyces spheroides* and *Streptomyces niveus* both first gave scant growth, slowly becoming quite good, with greyish-white sporulation and brownish discoloration of potato. Streptomyces No. 160 gives abundant, much wrinkled growth.

Carrot plug: Very good substrate growth, white becoming smoke-grey to blue-grey when sporulated. Some clear yellow exudate. *Streptomyces niveus* gave moderate growth with white aerial mycelium, white *Streptomyces spheroides* gave no growth.

Protetolytic activity: (a) Gelatin: Triplicate tubes were stab inoculated with a needle and spore suspension. Before judging, tubes were held 1 hour at 3° C., then returned to room temperature. In 7 days, no liquefaction, small white colonies on surface with dark brown soluble pigment (hue 2 pi-pl) immediately below the colonies. By 14 days, about 25 percent liquefaction, fair growth on surface plus some pellets submerged in liquified portion; dark brown soluble pigment. After 21 days, 100 percent liquefaction, color of gelatin brown-yellow (hue 2 pc) while color of control tubes was hue 1½ ca. *Streptomyces niveus* and *Streptomyces spheroides* both are reported to give good growth on gelatin but no soluble pigment. The former gives partial liquefaction and the latter rapid liquefaction (3 to 10 days). Streptomyces No. 160 gives rapid liquefaction, no soluble pigment. Streptomyces sp. No. 58383 gives poor growth on gelatin and no liquefaction.

(b) Milk: In 2 days, all five *Streptomyces hazeliensis* strains tested gave slight surface growth pellicle with creamy color; no coagulation or peptonization; pH by glass electrode same as control tubes, 6.0 to 6.2.

By 7 days, all give good firm surface growth pellicles, creamy to light brown color. Brown ring on tube wall; soluble pigment cream-yellow to light orange. One strain shows light peptonization; pH range 5.3 to 5.7 (control pH 5.7–6.1).

After 14 days, surface growth good but no sporulation; aerial mycelium leathery, rose-cream to a slight brown or lilac; no coagulation but slight peptonization. Cream-orange color (hue 4 ca-en) in unpeptonized portion; pH 5.2 to 5.7 (control pH 5.6).

Streptomyces No. 160 gives strong coagulation and strong peptonization of milk.

Nitrate reductase activity: (a) Organic broth: Growth good by 14 days, thick white pellicle; dark yellow soluble pigment. Slight nitrite production becoming strong after 21 days; heavy surface growth starting to sporulate, greyish.

(b) Inorganic broth: Light growth with no reduction for 14 days; good surface growth by 21 days, but no nitrite production, with nitrate still present. Smith et al., Streptonivicin, A New Antibiotic, Antib. and Chemother. 6, 135–142 (1956), find that *Streptomyces niveus* gives no nitrate reduction on either synthetic or nutrient nitrate broth; *Streptomyces spheroides* gives only faint reduction of nitrate agar to nitrite in 4 days, while streptomyces sp. No. 58383 gives strongly positive nitrite production.

Production of hydrogen sulfide: After 21 hours, slants showed very faint growth but strong $H_2S$ development; by 14 days, shiny looking colonies; dark blue color of medium changed to dark brown.

Tyrosine agar: All 5 strains tyrosinase positive, with light growth in 14 days, aerial mycelium white, reverse white; no pigment after 7 days, but by 14th day, pigment is beige-grey, hue 3 ec-ge (control hue 1½ db).

Carbon utilization: Xylose, arabinose, rhamnose, glucose, fructose, sucrose, lactose, raffinose (±), inositol, cellobiose, trehalose, citrate, malate, and succinate are utilized. Not utilized are inulin, maltose, mannitol, sorbitol, acetate, formate, oxalate, and tartrate.

It is to be noted that *Streptomyces niveus* and *Streptomyces spheroides* have been found to utilize inulin, maltose, mannitol and sorbitol in contrast to *Streptomyces hazeliensis*, whereas they did not grow on the citrate or succinate media in parallel trials where *Streptomyces hazeliensis* did. *Streptomyces niveus* utilizes formate, oxalate, tartrate, and sodium citrate.

Nitrogen utilization: L (+) arginine is utilized. Not utilized are methionine, sarcosine, creatine, amino-isobutyric acid, taurine, and betaine.

Antagonistic properties: Produces the sugordomycin antibiotics, but has not been found under any condition to produce novobiocin. *Streptomyces spheroides* and *Streptomyces niveus* both produce novobiocin but no sugordomycin antibiotic, even on media where *Streptomyces hazeliensis* yields only sugordomycin antibiotics.

In summary, *Streptomyces hazeliensis* differs morphologically both from *Streptomyces niveus* and *Streptomyces spheroides* in its lack of corkscrew coiled loops occurring at the tips of the sporophore (*Streptomyces niveus*) and its lack of tight, compact, ball-like spirals typical of *Streptomyces spheroides*.

While *Streptomyces niveus* and *Streptomyces spheroides* cause a characteristic cracking and splitting of nutrient agar media very early, *Streptomyces hazeliensis* generally does not. *Streptomyces niveus* frequently produces a soluble pigment on various agar media, whereas *Streptomyces spheroides* is generally not a pigment producer. *Streptomyces hazeliensis*, on the other hand, generally does produce pigment, even more than *Streptomyces niveus*.

It has also been discovered that the composition of the media in which the *Streptomyces hazeliensis* is cultured markedly affects (a) the amount of antibiotic produced, (b) the rate of antibiotic formation, and (c) the kind of antibiotic mixture in the broth.

The potency of fermented broths produced in flasks or tanks is determined by the usual cup-plate agar diffusion method, using *Staphylococcus aureus* as the test organism. (D. C. Grove and W. A. Randall, Assay Methods of Antibiotics. A Laboratory Manual, Medical Encyclopedia Inc., New York, 1955, pages 7–16.)

One unit of activity was arbitrarily assigned to that amount of antibiotic which when dissolved in 1 ml. of aqueous buffer produced an inhibition zone of 18 mm. diameter on the assay plate. The cylinders themselves are 8 mm. in diameter. The pure antibiotic I has a reference value of 5500 units/mg.

Green or yellow split peas constitute a superior source of nitrogen. Soybean flour, corn distillers' dried grains with solubles, cottonseed flour, coconut protein meal, linseed oil meal, and dried corn fermentation solubles with grain (Soluferm) all gave fair to good yields, which were usually inferior, however, to pea-containing media. The addition to peas of small quantities of ferrous sulfate, bone ash, or cornsteep dried solids did not increase antibiotic yields; but the presence of $CaCO_3$ and $K_2HPO_4$ did result in an increase in antibiotic yields.

The addition of a carbohydrate to natural complex nitrogen sources had variable effects; certain carbohydrates proved to be harmful to antibiotic production. With certain other carbohydrates, the carbon/nitrogen ratio in the medium must be controlled in order to obtain a good yield of antibiotic. The addition to a yellow pea medium of 0.25 percent levels of sodium salts of organic acids all caused the inhibition of antibiotic production. In this experiment a basal medium was used containing 3 percent yellow split peas, 0.1 percent $CaCO_3$, and 0.1 percent $K_2HPO_4$.

Effect of mineral elements: It has already been noted above that the addition of 0.1 percent $CaCO_3$ and $K_2HPO_4$ results in the production of higher yields of antibiotics. If both $CaCO_3$ and $K_2HPO_4$ are omitted or the concentrations of either one or both are increased to the 0.5 percent level, drastic decreases in antibiotic yield result. Also, the addition of 0.3 percent concentrations of NaCl or $(NH_4)_2SO_4$ drastically decreases the antibiotic yield.

Antifoam agents are generally employed to control the foaming produced during large fermenter runs. It was found that any of a variety of plant oils such as safflower, cottonseed, sesame, coconut, soybean, or animal oils such as lard, oleic acid, etc., can be used without decreasing antibiotic yield. Also, silicone antifoams did not decrease antibiotic yield.

In the following table the yield of antibiotic produced on the same media by *Streptomyces hazeliensis*, *Streptomyces niveus*, and *Streptomyces spheroides* is compared. It should be noted that all of the inhibition zones produced by the active *Streptomyces niveus* and *Streptomyces spheroides* media were neither clear nor sharp, whereas the zones produced by *Streptomyces hazeliensis* were very clear and sharp. These differences in appearance of the inhibition zones also serve to differentiate sugordomycin from novobiocin.

TABLE 3

| | *Staphylococcus aureus* plate units/ml. | | | | | |
|---|---|---|---|---|---|---|
| | 4 days | | | 6 days | | |
| Composition of medium, in percent | Strep. hazeli- ensis | Strep. niveus | Strep. sphe- roides | Strep. hazeli- ensis | Strep. niveus | Strep sphe- roides |
| 2 split peas, 1 cornstarch, 0.1 $CaCO_3$, 0.1 $K_2HPO_4$ | 69 | 50 | 47 | 320 | 53 | 5 |
| 4 cornsteep liquor, 5 glucose 0.05 $KH_2PO$, 0.3 $NaNO_3$, 0.1 $MgSO_4 \cdot 7H_2O$ | 0 | 0 | 0 | 0 | Trace | 9 |
| 2 soyflour, 2 brown sugar, 0.25 cornsteep dried solids, 0.1 $K_2HPO_4$ | Trace | 0 | 0 | 13 | 0 | 0 |
| 2 distillers dried solubles (Soludri) 2 glucose, 0.1 $K_2HPO_4$, 0.1 $CaCO_3$ | 0 | 54 | 37 | 0 | 69 | 5 |
| 2.5 Pharmamedia [1], 2.5 glucose | 0 | 48 | 10 | 0 | 3 | Trace |
| 2 Fermamine [2] type III, 1 starch, 0.1 $K_2HPO_4$, 0.05 $MgSO_4$ | 0 | 8 | 19 | 0 | 6 | 6 |

[1] Pharmamedia is a 56 percent protein-24 percent carbohydrate-containing material from cottonseed meal. Traders Oil Mill Co., Fort Worth, Tex.
[2] Fermamine is an enzymatic protein hydrolysate of Sheffield Chemical Co., Norwich, N.Y.

The effect of carbohydrate addition on antibiotic production can be seen from the table given below in which the basal medium contained 2 percent yellow split peas.

TABLE 1

| Addition to basal medium: | S. aureus units/ml. of whole broth in 7 days |
|---|---|
| 1 percent corn starch (control) | 180 |
| 1 percent mannitol | 120 |
| 1 percent glycerol | 50 |
| 2 percent glycerol | Trace |
| 1 percent maltose | 55 |
| 1 percent arabinose | 4 |
| 1 percent rhamnose | 12 |
| 1 percent lactose | 18 |
| 1 percent inositol | 3 |

In the following experiments recorded in Table 2, 0.1 percent $CaCO_3$ and 0.1 percent $K_2HPO_4$ are present in addition to 2 percent yellow split peas to form the basal medium.

TABLE 2

| Addition to basal medium | S. Aureus units/ml. of whole broth | Day of maximum yield |
|---|---|---|
| 1.0 percent corn starch (control) | 590 | 7 |
| 0.5 percent corn starch | 310 | 6 |
| 2.0 percent corn starch | 400 | 7 |
| 1 percent glucose | 230 | 7 |
| 2 percent glucose | 25 | 7 |
| 1 percent brown sugar | 100 | 7 |
| 2 percent brown sugar | 0 | 7 |
| 1 percent dextrin | 360 | 7 |
| 2 percent dextrin | 290 | 5 |
| 1 percent xylose | 0 | 7 |

Accordingly, the process for producing a mixture of sugordomycin antibiotics comprises culturing *Streptomyces hazeliensis* in a nutrient medium containing organic carbon and nitrogen sources, preferably split peas (which is both a carbon and a nitrogen source), and optionally, though preferably, from about 0.05 to about 3 percent; preferably about 0.1 percent $CaCO_3$; from about 0.01 to about 0.5 percent, preferably about 0.1 percent $K_2HPO_4$; and from about 0.1 to about 3 percent, preferably from about 1 to about 2 percent of a carbohydrate, e.g. a starch or any sugar listed on page 13, lines 1–3. The culturing is preferably carried out for from about 3 to about 8 days at an aeration rate of from about 0.5 to about 10 cfm. per 50 gallons of medium, and at a temperature of from about 20° C. to about 35° C. The antibiotic mixture is then isolated from the resulting fermentation broth.

The antibiotic mixture can be isolated from the fermentation both by several techniques. One technique is to acidify the broth, preferably with phosphoric acid, although other mineral acids, e.g., HCl, $H_2SO_4$, etc., can be employed, to a pH in the range of about 2 to about 7, preferably at a pH of about 4 to about 4.5. A filter aid, e.g., a diatomaceous earth, is then optionally added, and the acidified broth filtered. The filter cake thus obtained is suspended in an organic solvent, e.g., a lower alkanol, such as methanol, ethanol, butanol, isobutanol, etc., acetone, methylisobutylketone, butyl acetate, or mixtures of these solvents, e.g. acetone-methylene chloride, methanol-benzene, etc., with butanol preferred. The resulting slurry is then filtered or centrifuged and the clear filtrate or extract is neutralized with an alkali, e.g., 50 percent sodium hydroxide solution, to a pH of about 6 to about 7, and the solvent removed, e.g. under reduced pressure and at a temperature below about 50° C., to form a concentrate, for example, to a concentration of about 1/40 of the original volume. This concentrate is then mixed with a nonpolar organic solvent, e.g., a hydrocarbon solvent or an ether, such as petroleum ether, B.P. 60–90° C., benzene, hexane, pentane, diethyl ether, etc., whereupon the crude antibiotic mixture precipitates in the form of its sodium salt or a mixture of its sodium salt and free form, in which form it is readily recoverable, e.g. by settling, filtration, centrifugation, etc.

Another method that can be used to isolate the crude antibiotic from the fermentation broth is to filter off the cells, acidify the filtrate with a mineral acid to a pH of about 1 to about 7, and then contact the acidified filtrate with a water-immiscible solvent such as butanol, butyl acetate, ethyl acetate, ether, chloroform, methylisobutylketone, etc. After separating the aqueous layer, the water-immiscible solvent is removed to leave the crude antibiotic mixture, or alternatively, the water immiscible solvent solution can be passed through an adsorbent, e.g., an ion exchange resin, e.g., Zeo-Karb H, Dowex–50 W, Amberlite IRC–50, Amberlite IR–4, Amberlite IR–100, Ionac A–300, Dowex–1 chloride, Dowex–1 base, Dowex–1 formate, etc., or activated charcoal, etc., to adsorb the antibiotic mixture, which is then removed from the adsorbent by elution with a solvent such as methanol. The cells which were filtered off are then extracted with an organic solvent such as a lower alkanol, e.g., methanol, ethanol, butanol, isobutanol, etc.; acetone; butyl acetate; acetone-methylene chloride; methylisobutylketone; methanol-benzene; etc. The solvent is then removed leaving behind the crude antibiotic mixture, which can then be combined with the antibiotic mixture obtained from the filtrate above.

The crude sodium salt of the antibiotic mixture obtained above or the crude acidic antibiotic is purified by suspending the antibiotic mixture in acetone and treating it with sufficient mineral acid, e.g., HCl, to give an acid pH, e.g., a pH of from about 2 to about 6, preferably about pH 4.0. The insoluble material is filtered off and the filtercake washed with a small quantity of acetone. The combined filtrate and wash are evaporated under vacuum to form a concentrate, e.g., about 1/8 the original volume, and the concentrate added to water and benzene giving a suspension of solids in the two liquid phases. The suspension, which is the free acidic antibiotic mixture, is filtered off, the precipitate suspended in warm methanol, and the methonal suspension cooled. The solid which separates is filtered off. This solid is the purified free acidic antibiotic mixture.

The crude antibiotic mixture can also be purified by the preparation of its benzylamine salt. The antibiotic mixture isolated above can be dissolved in an organic solvent, e.g., n-butanol, n-butyl acetate, ether, ethyl acetate, etc., and treated with an excess of benzylamine. The benzylamine salt of the antibiotic mixture precipitates. Many of the impurities contained in the crude antibiotic mixture remain behind in the organic solvent. The precipitated benzylamine salt is filtered off and the free antibiotics obtained from the benzylamine salt by treatment with an aqueous mineral acid, e.g., aqueous hydrochloric acid, followed by extraction of the free antibiotic mixture from the aqueous system by the use of an organic solvent immiscible or only slightly miscible with water, such as n-butyl acetate, n-butanol, ether, ethyl acetate, etc. The immiscible solvent is then removed and the residue reprecipitated, e.g., from a hot methanol-benzene mixture.

Other amines were employed in an attempt to purify the antibiotic mixture but only the benzylamine salt was found to be fully satisfactory. Among the other bases that are not satisfactory are calcium hydroxide, procaine, ethylenediamine, diethanolamine, monoethanolamine, N,N' - dibenzylethylenediamine, dimethylethanolamine, hydroxyethylethylenediamine, diisobutylamine, and furfurylamine.

The crude antibiotic mixture can also be purified by distributing the crude mixture between an organic solvent, e.g., butyl acetate, ether, or mixtures of chloroform and isopropanol, etc., and an aqueous buffer solution buffered to about pH 6.8 to about 11. The antibiotic mixture is in the aqueous buffer solution, from which it can be isolated by acidification, e.g. with a mineral acid such as HCl, $H_2SO_4$, etc., to about pH 2 to about pH 5 and the resulting suspension is extracted with an organic solvent immiscible or only slightly miscible with water, e.g., n-butanol, n-butyl acetate, ether, ethyl acetate, etc. and the purified acidic antibiotic mixture is recovered from the organic solvent, e.g. by evaporation of the solvent.

The above antibiotic mixture purified by any one of the above techniques can then be separated into its constituent antibiotics, preferably by the use of a countercurrent distribution ssytem, e.g., a Craig countercurrent distribution system. The organic solvent is an organic solvent immiscible or only slightly miscible with water, e.g., n-butanol, n-butyl acetate, ether, ethyl acetate, chloroform-isopropanol, etc. The aqueous phase is water buffered to a pH in the range of about 6 to about 9, preferably about 8 to about 8.9. The buffers that can be employed are those commonly used for this purpose, such as phosphate and borate buffers.

Alternatively, the purified antibiotic mixture can be used therapeutically as such, e.g., against *Staphylococcus aureus* by introducing the antibiotic mixture into the animal body, e.g., by injection or orally either in the acidic form or as a salt, such as the sodium salt, potassium salt or any other pharmaceutically acceptable base addition salt.

Another feature of the instant invention is the synthetic preparation of the most active antibiotic of the invention against *Staphylococcus aureus*, i.e. N,N'-bis{4-hydroxy-8-methyl-7-[4-O-methyl-5,5-dimethyl-3-O-(5 - methyl - 2-pyrrolylcarbonyl)-α-L-lyxopyranosyloxy] - 2 - oxo-2H-1-benzopyran-3-yl}-3-methyl-2,4-pyrroledicarboxamide.

The synthesis of the above antibiotic is carried out according to the following reaction scheme:

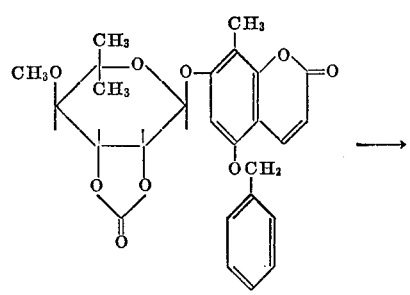

IX

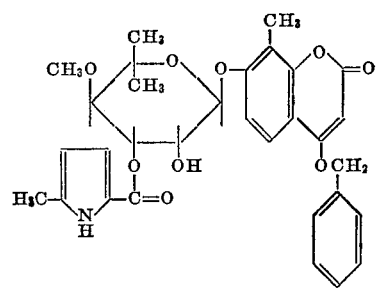

X

13
4-benzyloxy-7α-(2,3-O-carbonyl)-noviosyloxy-
8-methyl-coumarin

14
4-benzyloxy-7α-3-O-[5'-methyl-2'-carbonyl-pyrrole]-
noviosyloxy-8-methyl-coumarin

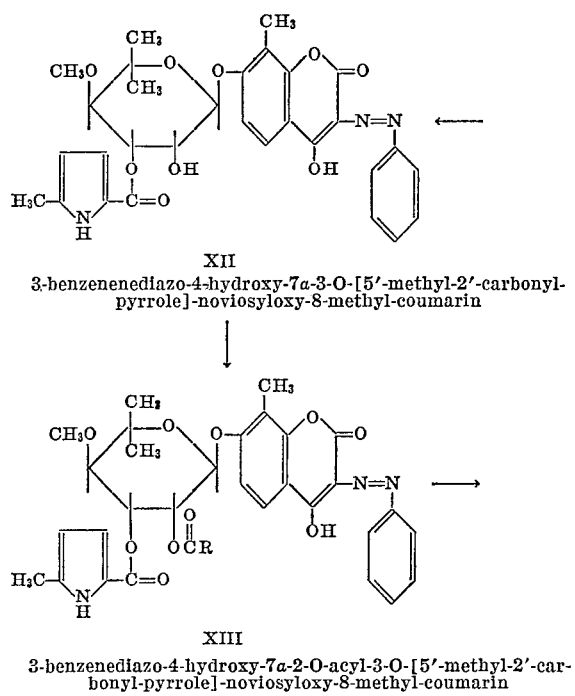

XII
3-benzenediazo-4-hydroxy-7α-3-O-[5'-methyl-2'-carbonyl-
pyrrole]-noviosyloxy-8-methyl-coumarin

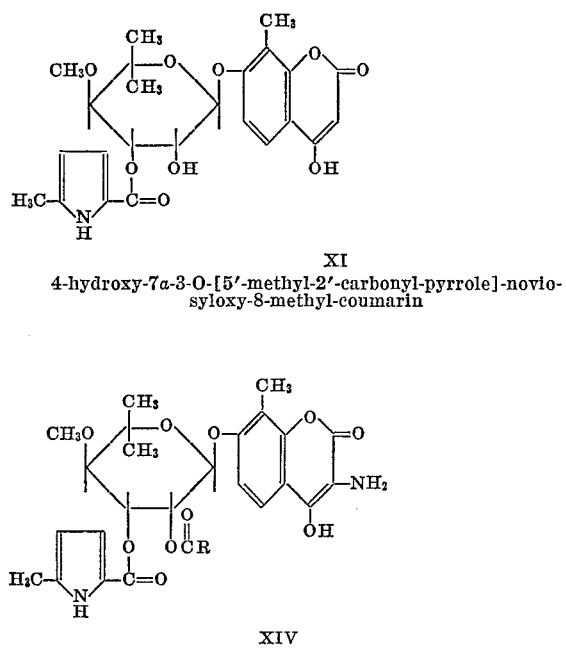

XI
4-hydroxy-7α-3-O-[5'-methyl-2'-carbonyl-pyrrole]-novio-
syloxy-8-methyl-coumarin XIII
3-benzenediazo-4-hydroxy-7α-2-O-acyl-3-O-[5'-methyl-2'-car-
bonyl-pyrrole]-noviosyloxy-8-methyl-coumarin XIV
3-amino-4-hydroxy-7α-2-O-acyl-3-O-[5'-methyl-2'-carbonyl-
pyrrole]-noviosyloxy-8-methyl-coumarin 2,4-dihalocarbonyl-3-
methyl-pyrrole (X=Cl or Br)

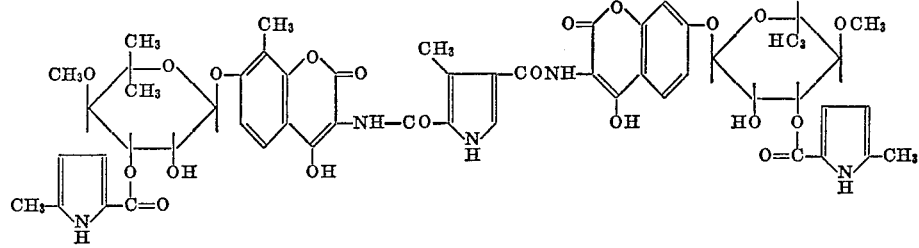

I

N,N'-bis{4-hydroxy - 8 - methyl - 7 - [4-O-methyl-5,5-dimethyl - 3 - O - (5 - methyl - 2 - pyrrolylcarbonyl)-L-lyxopyranosyloxy] - 2 - oxo - 2H - 1 - benzopyran-3-yl}-3-methyl-2,4-pyrroledicarboxamide.

In the above reaction scheme, in the acyl group

in Formulae XIII and XIV the R group therein can be an alkyl group, an aralkyl group, a phenyl group, or an alkyl- or halo-substituted phenyl group, preferably a lower alkyl group.

The process of the invention shown in the above reaction scheme is carried out by (a) reacting 4-benzyloxy - 7α - (2,3 - O - carbonyl)-noviosyloxy-8-methyl-coumarin (IX) with a 2-methyl-pyrrole Grignard reagent, i.e. a 2-methyl-pyrrole magnesium halide, preferably bromide, and decomposing the reaction product thereof in aqueous acid solution, e.g., aqueous mineral acid solution, such as dilute hydrochloric acid, to form 4-benzyloxy - 7α - 3 - O - [5' - methyl-2'- carbonyl-pyrrole]-noviosyloxy-8-methyl-coumarin (X).

(b) Compound X is treated with hydrogen in the presence of a hydrogenation catalyst, i.e., palladium-on-charcoal, etc., to yield 4-hydroxy-7α-3-O-[5'-methyl-2'-carbonyl-pyrrole]-noviosyloxy-8-methyl coumarin (XI).

(c) Compound XI is treated with diazotized aniline to yield 3 - benzenediazo - 4 - hydroxy - 7α - 3 - O - [5'-methyl - 2' - carbonyl-pyrrole] - noviosyloxy-8-methyl-coumarin (XII).

(d) Compound XII is treated with an acylating agent, i.e. an acylating agent having the group

where R has the meaning given above, e.g. acetic anhydride in pyridine to form 3-benzene-diazo - 4 - hydroxy-7α - 2 - O - acyl - 3 - O - [5' - methyl - 2' - carbonyl-pyrrole] - noviosyloxy - 8 - methyl-coumarin (XIII). Other acylating agents that can be used to form compound XIII include the acyl halides, e.g., acetyl chloride, etc.

(e) Compound XIII is then treated with hydrogen in the presence of a hydrogenation catalyst, e.g., palladium-on-charcoal or other hydrogenation catalysts as given above for the hydrogenation of compound X to yield 3 - amino - 4 - hydroxy - $7\alpha$ - 2 - O - acyl - 3 - O - [5'-methyl - 2' - carbonyl - pyrrole] - noviosyloxy-8-methyl-coumarin (XIV).

(f) Compound XIV is then reacted with a 2,4-dihalo-carbonyl - 3 - methyl-pyrrole, wherein halo is chlorine or bromine, to give the antibiotic prepared by the process of the invention.

The invention will be better understood from a consideration of the following examples which are given for illustration purposes only and are not meant to limit the invention.

EXAMPLE 1

*Streptomyces hazeliensis* is stored in the spore form, in medicine bottles in either tomato-oatmeal agar, or in the lyophilized form, i.e., spores lyophilized in 10 percent bovine albumin or 10 percent skim milk. An aqueous suspension of spores is inoculated into a six-liter shake flask containing 3 liters of medium composed of 1 percent ground split peas, 1 percent cornstarch, 0.1 percent $CaCO_3$, 0.1 percent $K_2HPO_4$, and 0.1 percent lard oil, and incubated at 28° C. for 3 to 5 days on a rotary shaker at 200 r.p.m. until good growth has occurred. The incubation is carried out in equipment which provides for aeration of the medium such as the above shake flask or an aerated bubbler bottle. The vegetative growth obtained is inoculated into a 100 gal. fermenter containing 60 gallons of a medium composed of 3 percent split peas, 0.1 percent $CaCO_3$, 0.1 percent $K_2HPO_4$, 0.03 percent silicone paste (Dow-Corning Silicone A paste), and 0.1 percent of lard oil. Alternatively, 60 gallons of the medium described above can equally well be employed. The fermenter is maintained at 28° C. for from 3 to 4 days with an airflow rate of 8 c.f.m. During this time the viscosity increases markedly and the pH drops to 5.9–6.6. The above growth is then transferred to a 9000 gallon fermenter which contains 6000 gallons of sterilized medium composed of 3 percent ground split peas, 0.1 percent $CaCO_3$, 0.1 percent $K_2HPO_4$, and 0.03 to 0.05 percent of Dow-Corning Silicone A suspended in 0.1 percent of soybean oil. The fermentation is allowed to proceed at 28° C. for from 5 to 8 days depending on the in vitro bioassay. Aeration is maintained at the rate of 25 c.f.m. of air for the first 24 hours, then 100 c.f.m. for 24–72 hours, and 150 c.f.m. for 72–168 hours. At harvesting the whole broth is acidified to pH 3.9 by the addition of 85 percent sirupy phosphoric acid, followed by 1650 lbs. of a diatomaceous filter aid, and the acidified broth filtered. The filter cake is added to 2000 gallons of n-butanol with vigorous agitation. The butanol slurry is allowed to stand overnight without agitation, then centrifuged. The clear butanol extract is neutralized with 1482 ml. of 50 percent NaOH solution to about pH 7, and then flash evaporated under reduced pressure at a temperature below 50° C. to a volume of 50 gallons.

This concentrate is added to 250 gallons of vigorously stirred petroleum ether (B.P. 60–90°) whereupon a precipitate of the crude sodium salt of the antibiotic mixture separates. This crude sodium salt probably consists of a mixture of the acidic and partially neutralized forms of the various components of the antibiotic mixture. The crude sodium salt is isolated by centrifuging and then dried.

EXAMPLE 2

Purification of the crude sodium salt (a) By distribution between solvent and buffers.—50 g. of the above crude sodium salt is suspended in 1 liter of methanol and stirred for 30 minutes. The insoluble material is then filtered off and the filtrate concentrated in vacuo to a thick sirup. The thick sirup is suspended in 25 ml. of methanol and 625 ml. of 0.1 N hydrochloric acid. This suspension is extracted three times with 1.5 liter portions of ether and the combined ether extracts totaling 4.24 liters are extracted twice with 1.1 liters of pH 6.2 M/15 phosphate buffer, then twice with 1.1 liters of pH 7.0 M/15 phosphate buffer. Little activity is extracted by this treatment. The ethereal solution is extracted twice with 1.1 liters of pH 7.8 M/15 phosphate buffer, whereupon the antibiotic mixture moves into the aqueous phase. The pH of this extract is lowered to 7.0 and the suspension extracted with n-butanol which dissolves the precipitate. The n-butanol is evaporated in vacuo leaving a solid. The solid is suspended in pH 6.5 M/15 phosphate buffer and the insoluble material, the purified antibiotic mixture, filtered off and dried.

(b) By preparation of the benzylamine salts.—One hundred g. of crude sodium salt is dissolved in 10 liters of M/15 disodium phosphate buffer of pH 9.5. The insoluble material is filtered off with the use of a filter aid and the dark filtrate acidified to pH 2.5 with concentrated hydrochloric acid. This suspension is extracted with an equal volume of butyl acetate which dissolves the precipitated antibiotic. The butyl acetate solution is then concentrated in vacuo to 1800 ml., a small amount of insoluble matter filtered off, then 100 ml. of benzylamine dissolved in 100 ml. of butyl acetate added. A fine precipitate of the benzylamine salt of the antibiotic separates. After settling, the precipitate is collected by filtration, washed first with a little butyl acetate, then anhydrous ether.

Twenty g. of a benzylamine salt of the antibiotic is dissolved in 140 ml. of methanol, 190 ml. of water added, and the pH of the suspension adjusted to 2.5 with hydrochloric acid. Another 300 ml. of water is then added to increase the fluidity of the suspension, and the mixture extracted twice with 400 ml. portions of butyl acetate. The combined butyl acetate extracts are concentrated to approximately 800 ml., at which point the crude acid has precipitated. The solid is filtered off and washed with cold methanol. This product is then reprecipitated by dissolving it in hot methanol and benzene from which the antibiotic separates as a finely divided solid that melts at 228–230° when dry.

(c) By acetone extraction.—50 g. of the above crude sodium salt is suspended in 600 ml. of acetone, 30 ml. of 10 percent hydrochloric acid added and the mixture stirred overnight. The insoluble material is filtered off and the filtercake washed with a little acetone. The combined filtrate and wash is evaporated in vacuo to about 100 ml. To this concentrate are added 500 ml. of water and 200 ml. of benzene giving a suspension of solids in 2 liquid phases. The precipitate which is obtained from this suspension is the crude acidic antibiotic mixture. This precipitate is suspended in 100 ml. of methanol at 40–50°, cooled to room temperature, and then kept in a refrigerator overnight. The solid which separates is the purified antibiotic mixture.

EXAMPLE 3

Separation of the purified antibiotic mixture into its components 5 g. of purified antibiotic mixture obtained by the acetone purification process (c) is distributed in a 200-tube Craig countercurrent distribution apparatus between an upper aqueous phase of M/15 $K_2HPO_4$ buffer at pH 8.2 and a lower organic phase consisting of equal parts of isopropyl alcohol and chloroform. After equilibration of the buffer and organic phases, the distribution is carried out in the usual manner over the 200 tubes, each of which contains 40 ml. of each phase. This distribution gives a mixture of antibiotics I, II, III and IV in tubes 1–140, and a mixture of antibiotics V, VI, VII and VIII in tubes 141–200.

The run is then extended through an additional 200 tubes, this time with the buffer at pH 8.9.

In the upper phase of the extended run (total, 400 tubes), antibiotic I [identified above] is present in tubes 120 through 152. Antibiotic II or III is present in tubes 161 through 170. Antibiotic III or II is present in tubes 185 through 195. It is not known for certain which antibiotic designated II or III is present in tubes 161 through 170 and which antibiotic is present in tubes 185 through 195. Tubes 153 through 160 contain a mixture of antibiotic I and either II or III and tubes 171 through 184 contain a mixture of antibiotics II and III.

In a lower phase, the tubes contain the same antibiotic distribution as in the upper phase.

The antibiotics are isolated from the solvent phase by combining the contents of the groups of tubes given above, e.g., for the preparation of antibiotic I tubes 120 through 152 are combined, and the solvent removed by evaporating to dryness. For the buffer phase the contents of the groups of tubes given above are acidified to pH 2.5, the antibiotic extracted into butanol, $CHCl_3$-isopropyl alcohol (1:1) solvent, and the solvent extract evaporated to dryness leaving the antibiotic as a residue.

Antibiotic I obtained from the above countercurrent distribution is then passed through another 200 tubes. Three isomers, obtained at tubes 90 through 100, at tube 120, and at tube 140 are obtained, indicating the presence of several closely related isomers, the absolute structures of which are not known at present. All of these isomers are bioactive, e.g., exhibit a high degree of activity against *Staphylococcus aureus*.

The mixture of antibiotics V, VI, VII, and VIII isolated above is resolved into a mixture of antibiotics V and VI, and a mixture of antibiotics VII and VIII by countercurrent distribution in a Craig countercurrent apparatus of 200 tubes. The solvent system employed consists of equal parts of the same organic phase employed above, i.e., an equal mixture by volume of isopropyl alcohol and chloroform while the aqueous phase is M/15 $K_2HPO_4$ buffer at pH 7.0. The solvent and buffer are equilibrated and the above antibiotic mixture (V–VIII) introduced into the apparatus and passed through the 200 tubes. The mixture of antibiotics V and VI is centered about the 110th tube and the mixture of antibiotics VII and VIII is centered about the 170th tube.

EXAMPLE 4

Preparation of 4-benzyloxy-7α-3-O-[5'-methyl-2'-carbonyl-pyrrole]-noviosyloxy-8-methyl-coumarin (X)

To a solution of $CH_3MgI$ (prepared from 1.25 g. of Mg+3 cc. of $CH_3I$ in 50 cc. of abs. ether) is added dropwise 8 g. of 2-methylpyrrole in 30 cc. abs. ether. The solution is refluxed for 10 minutes and added slowly to a solution of 4.8 g. of 4-benzyloxy-[2,3-O-carbonyl-α-noviosyloxy]-8-methyl-coumarin (IX) in 200 cc. of abs. benzene. A precipitate forms immediately. The mixture is stirred for 30 minutes and then dilute HCl is added carefully. After addition of ethyl acetate the organic layer is washed successively with $H_2O$, dilute $KHCO_3$, $H_2O$; dried over sodium sulfate and the solvent distilled off in vacuo. The residue, 4-benzyloxy-7α-3-O-[5'-methyl-2'-carbonyl-pyrrole]-noviosyloxy - 8 - methyl-coumarin, is crystallized from benzene. It is recrystallized from acetonitrile; M.P. 131–132° (dec.).

EXAMPLE 5

Preparation of 4-hydroxy-7α-3-O-[5'-methyl - 2' - carbonyl-pyrrole]-noviosyloxy-8-methyl-coumarin (XI)

4 g. of 4-benzyloxy-7α-3-O-[5'-methyl-2'-carbonyl-pyrrole]-noviosyloxy-8-methyl-coumarin (X) are dissolved in 200 cc. of ethylacetate and hydrogenated after addition of 2 g. of Pd on charcoal. 170 cc. of $H_2$ are used (theoretical amount 150 cc.). After filtration the solution is evaporated to dryness; 3.2 g. of a yellowish compound are obtained. A small sample is crystallized for analysis from acetonitrile; M.P. 173–175° (dec.).

EXAMPLE 6

Preparation of 3-benzenediazo - 4 - hydroxy-7α-3-O-[5'-methyl-2'-carbonyl - pyrrole]-noviosyloxy - 8-methyl-coumarin (XII)

1.6 g. of aniline are dissolved in 120 cc. of $H_2O$+3.2 cc. of conc. HCl and diazotized at 5° with 1.1 g. of $NaNO_2$, dissolved in 10 cc. of $H_2O$. 10 minutes after the addition of the nitrite is complete, a solution of 6.4 g. of sodium acetate in 30 cc. of $H_2O$ is added. 5 minutes thereafter a solution of 3.2 g. of 4-hydroxy-7α-3-O-[5'-methyl-2'-carbonyl-pyrrole] - noviosyloxy-8-methyl-coumarin (XI) in 40 cc. of alcohol is added dropwise with stirring at 5°. A yellow precipitate forms. Stirring is continued for three hours at 5°. The precipitate is then extracted into ethyl acetate, washed successively with $H_2O$ 1 N HCl, $H_2O$, the solution dried over sodium sulfate and the solvent distilled off in vacuo. The product, 3 - benzenediazo-4-hydroxy-7α-3-O-[5'-methyl - 2' - carbonyl-pyrrole]-noviosyloxy-8-methyl-coumarin (XII), is crystallized from benzene; M.P. 174–176°.

EXAMPLE 7

Preparation of 3-benzenediazo-4-hydroxy-7α-2-O-acetyl-3-O-[5'-methyl-2' - carbonyl - pyrrole]-noviosyloxy-8-methyl-coumarin (XIII)

6.5 g. of 3-benzenediazo-4-hydroxy-7α-3-O-[5'-methyl-2' - carbonyl-pyrrole]-noviosyloxy - 8 - methyl-coumarin (XII) is dissolved in 40 cc. of acetic anhydride and 20 cc. of pyridine and kept 18 hours at room temperature. The excess acetic anhydride is then decomposed with water, the resulting solution extracted with ethyl acetate and the ethyl acetate solution washed with 1 N HCl and with $H_2O$. After drying over sodium sulfate, the solvent is distilled off in vacuo. The residue, 3-benzenediazo-4-hydroxy-7α-2-O-acetyl-3-O-[5'-methyl-2' - carbonyl-pyrrole]-noviosyloxy-8-methyl-coumarin (XIII), is crystallized from isopropanol; M.P. 151–153° (dec.).

EXAMPLE 8

Preparation of 3-amino-4-hydroxy-7α-2-O-acetyl-3-O-[5'-methyl-2'-carbonyl-pyrrole] - noviosyloxy - 8-methyl-coumarin (XIV)

5.6 g. of 3-benzenediazo-4-hydroxy-7α-2-O-acetyl-3-O-[5' - methyl-2'-carbonyl-pyrrole] - noviosyloxy-8-methyl-coumarin (XIII) are dissolved in 250 cc. of abs. alcohol. 1 g. of palladium on charcoal is added and the substance hydrogenated. 410 cc. of $H_2$ are used (theoretical amount 400 cc.). After filtration the solution is evaporated to dryness, the residue dissolved in ethyl acetate and the solution washed with 0.5 N HCl and with water. After drying over sodium sulfate the solvent is distilled off in vacuo. There remains 5.3 g. of a yellow-brown foam, 3-amino-4-hydroxy-7α-2-O - acetyl-3-O-[5'-methyl 2' - carbonyl-pyrrole]-noviosyloxy - 8 - methyl-coumarin (XIV).

EXAMPLE 9

Preparation of N,N'-bis{4-hydroxy - 8 - methyl-7-[4-O-methyl-5,5-dimethyl-3-O-(5-methyl - 2 - pyrrolylcarbonyl)-L-lyxopyranosyloxy]-2-oxo - 2H-1-benzopyran-3-yl}-3-methyl-2,4-pyrroledicarboxamide 5.3 g. of 3-amino-4-hydroxy-7α-2-O-acetyl-3-O-[5'-methyl-2'-carbonyl-pyrrole]-noviosyloxy-8 - methyl-coumarin (XIV) is dissolved in 50 cc. of abs. pyridine. With stirring and cooling, 700 mg. of 2,4-dichlorocarbonyl-3-methyl-pyrrole, dissolved in 20 cc. of abs. tetrahydrofuran, is added dropwise and the solution kept at room temperature overnight. The dark solution is then diluted with ethyl acetate, washed successively with 1 N $H_2SO_4$ and water, dried over sodium sulfate and the solvent distilled off in vacuo. There remains 5.6 g. of a brown foam. The latter is dissolved in about 80 cc. of liquid ammonia, which is slowly evaporated. The residue is dissolved in water and a small amount of alcohol, and the solution washed thereafter with ethyl acetate. Upon acidification with dilute $H_3PO_4$, the precipitate is extracted with ethyl acetate. The solution is washed with water, dried over sodium sulfate and the solvent distilled off. The residue, a brown foam, is crystallized from methanol/benzene; M.P. 234–235°. After recrystallization from acetonitrile/acetone the antibiotic, N,N'-bis wherein R and R' are selected from the group consisting of hydrogen, 2-pyrrolecarbonyl, and 5-methyl-2-pyrrolecarbonyl; wherein no more than one of R and R' is hydrogen, and (b) lower alkyl salts thereof with pharmaceutically acceptable bases.

2. A compound selected from the group consisting of
(a) a compound of the formula

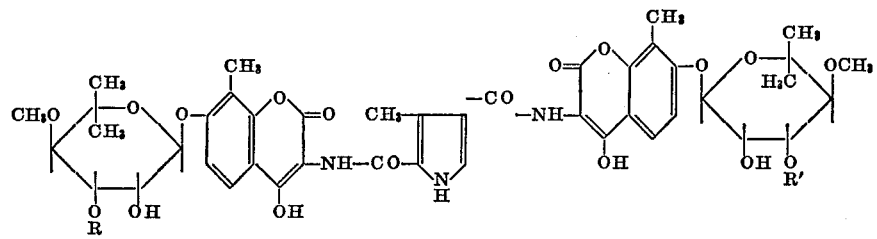

{4-hydroxy-8-methyl - 7 - [4-O-methyl-5,5-dimethyl-3-O-(5-methyl-2-pyrrolylcarbonyl) - α-L-lyxopyranosyloxy]-2-oxo-2H - 1-benzopyran - 3-yl}-3-methyl-2,4-pyrroledicarboxamide (I), shows a decomposition point of 238–239° (dec.).

A small sample is recrystallized from ethyl acetoacetate/DMF/$H_2O$; M.P. 258° (dec.).

wherein R and R' are selected from the group consisting of hydrogen, 2-pyrrolecarbonyl, and 5-methyl-2-pyrrolecarbonyl; wherein no more than one of R and R' is hydrogen, and (b) lower alkyl salts thereof with pharmaceutically acceptable bases.

3. A compound of the formula

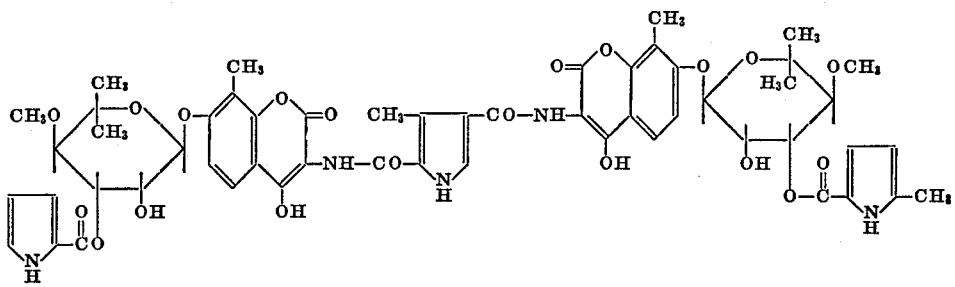

The above antibiotic has a decomposition point which is difficult to establish exactly and is furthermore dependent upon the rate of temperature rise and apparatus.

What is claimed is:
1. A compound selected from the group consisting of
(a) a compound of the formula

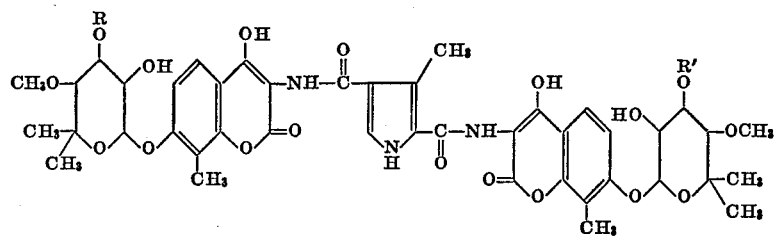

4. A compound of the formula

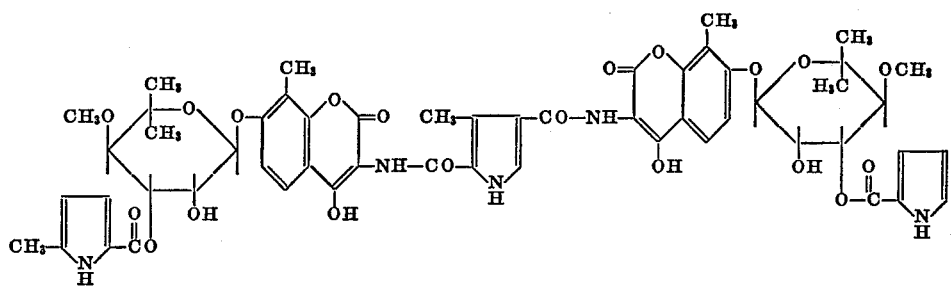

5. A compound of the formula
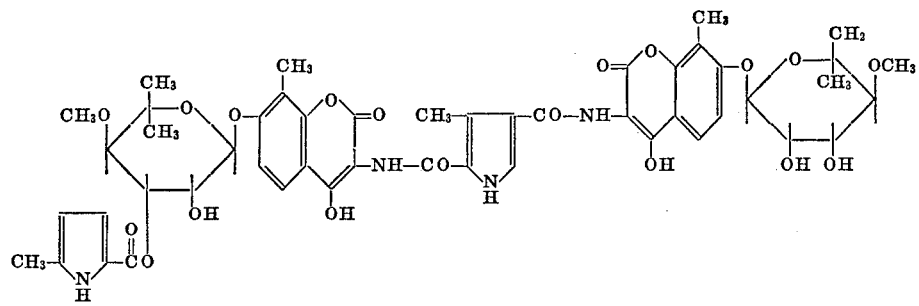
6. A compound of the formula
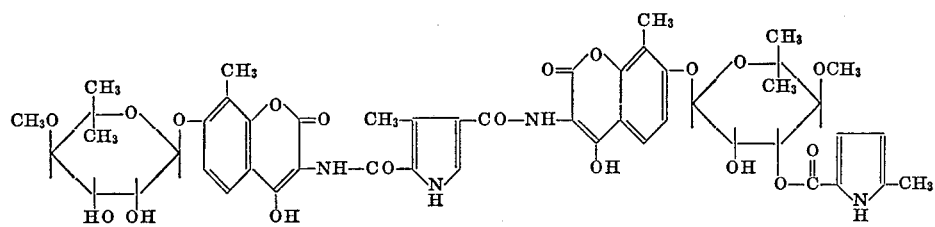
7. A compound of the formula
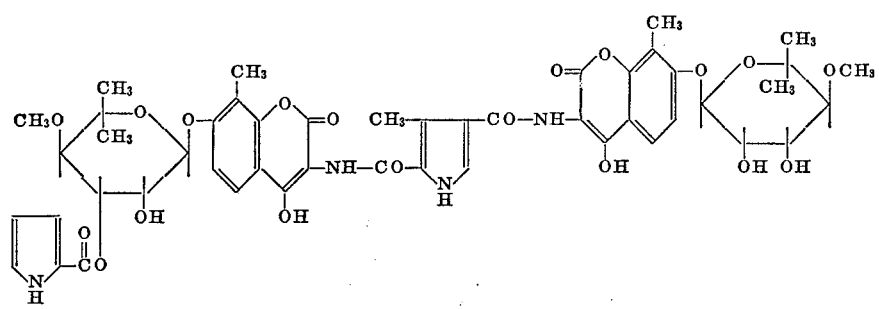
8. A compound of the formula
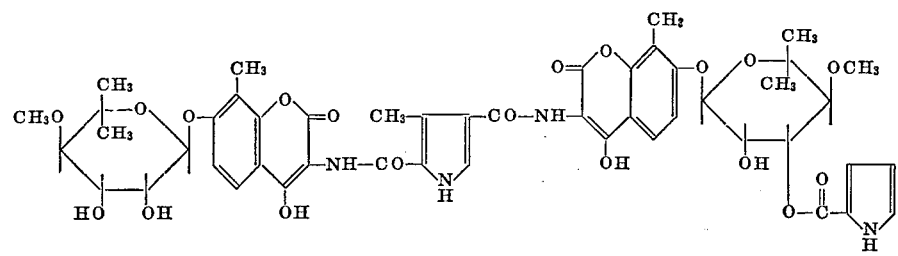
9. An antibiotic mixture containing an antibiotic of the formula
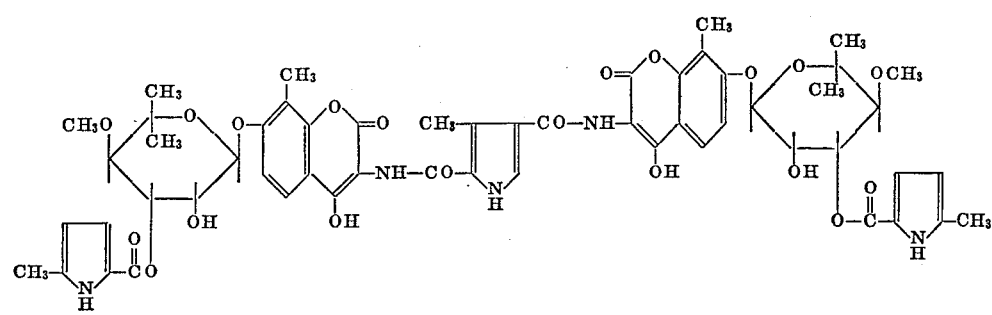

and at least one of the following:
(a) 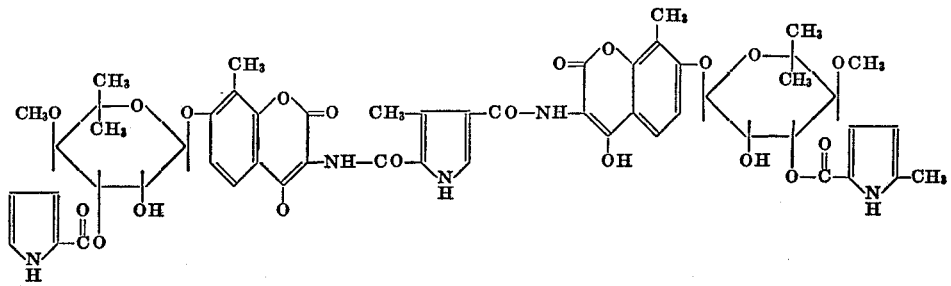
(b) 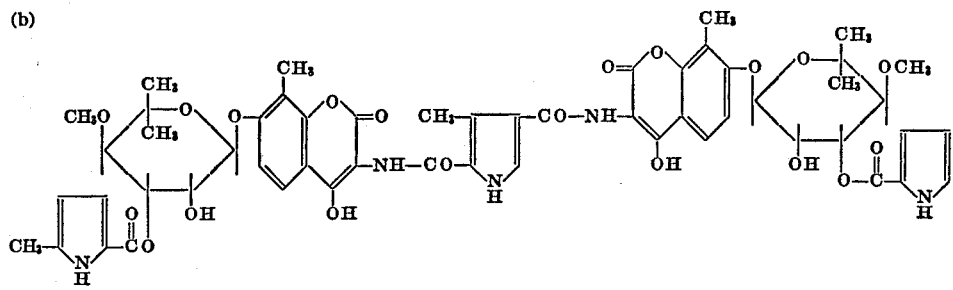
(c) 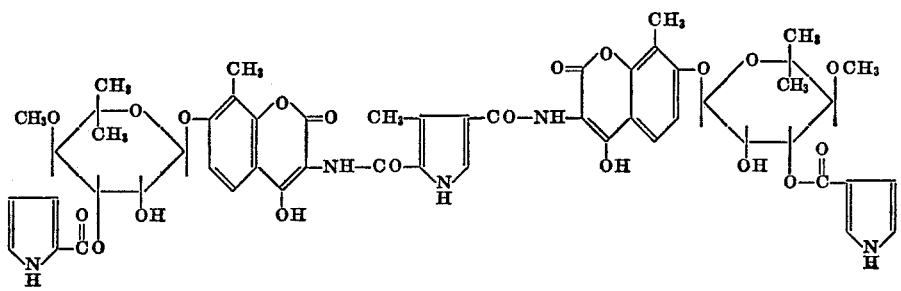
(d) 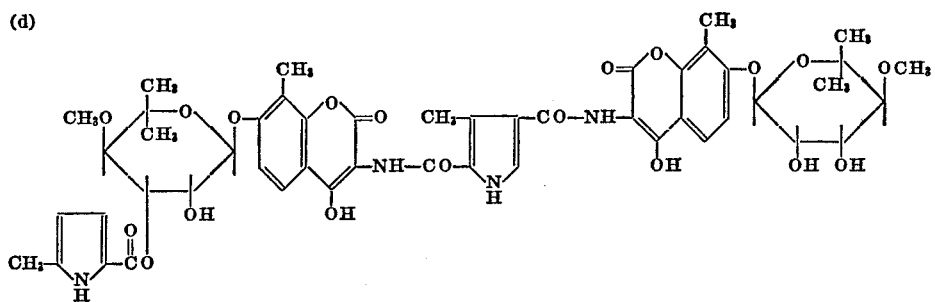
(e) 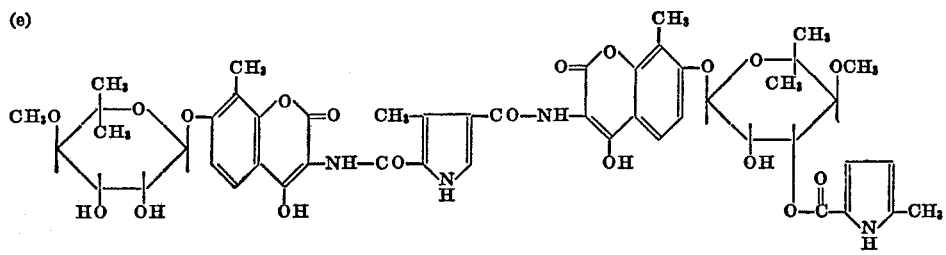
(f) 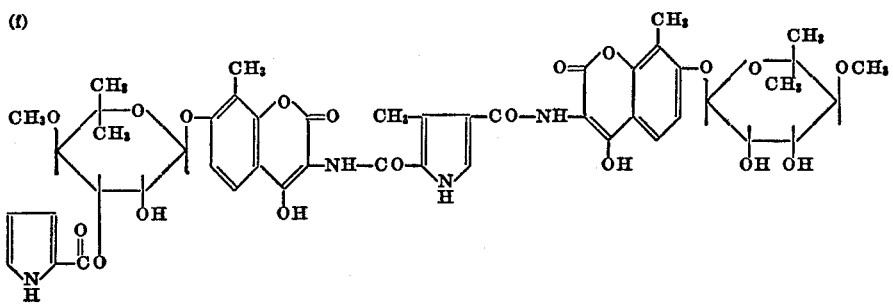

and (g) 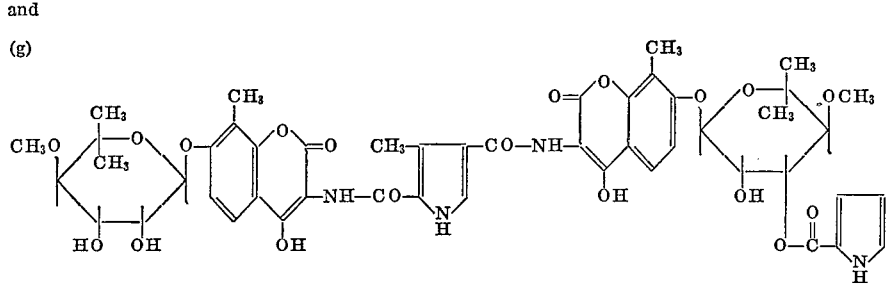

10. The benzylamine salt of the antibiotic mixture of claim 9.

11. 4 - benzyloxy - 7α - 3 - O - [5'-methyl-2'-carbonyl-pyrrole]-noviosyloxy-8-methyl-coumarin.

12. 4 - hydroxy - 7α - 3 - O - [5'-methyl-2'-carbonyl-pyrrole]-noviosyloxy-8-methyl-coumarin.

13. 3 - benzenediazo - 4 - hydroxy-7α-3-O-[5'-methyl-2'-carbonyl-pyrrole]-noviosyloxy-8-methyl-coumarin.

14. A compound of the formula

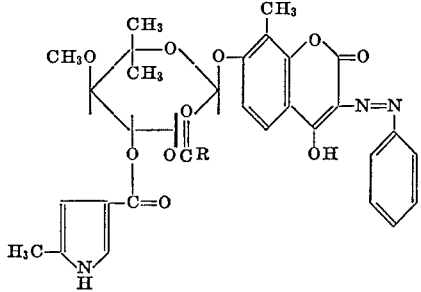

wherein R is lower alkyl.

15. A compound according to claim 14 wherein R is methyl.

16. A compound of the formula

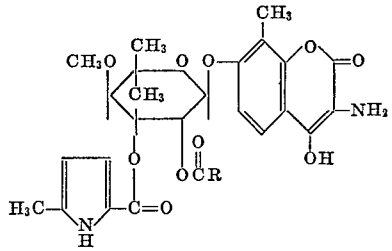

wherein R is lower alkyl.

17. A compound according to claim 22 wherein R is methyl.

18. A process for the preparation of N,N'-bis{4-hydroxy-8-methyl-7-[4-O-methyl - 5,5 - dimethyl-3-O-(5'-methyl-2'-pyrroyl L-lyxopyranosyloxy] - 2-oxo-2H-1-benzopyran-3-yl}-3-methyl-2,4 - pyrroledicarboxamide comprising the steps of
(a) reacting 4 - benzyloxy-7α-(2,3-O-carbonyl)-noviosyloxy-8-methyl coumarin with 2-methyl pyrrole magnesium halide, decomposing the reaction product thereof with an aqueous acid to form 4-benzyloxy-7α-3-O-[5'-methyl-2' - pyrroyl-noviosyloxy-8-methyl-coumarin,
(b) treating the latter compound with hydrogen in the presence of a hydrogenation catalyst to yield 4-hydroxy-7α-3-O-[5'-methyl - 2' - pyrroyl-noviosyloxy-8-methyl coumarin,
(c) reacting the latter compound with diazotized aniline to yield 3-benzenediazo-4-hydroxy-7α-3-O-[5'-methyl-2'-pyrroyl]-noviosyloxy-8-methyl coumarin,
(c) reacting the latter compound with diazotized aniline to yield 3-benzenediazo-4-hydroxy-7α-3-O-[5'-methyl-2'-pyrrol-noviosyloxy-8-methylcoumarin,
(d) reacting the latter compound with an acylating agent to form 3-benzenediazo-4-hydroxy-7α-2-O-acyl-3-O-[5'-methyl - 2' - pyrroyl]-noviosyloxy-8-methyl coumarin,
(e) reacting the latter compound with hydrogen in the presence of a hydrogenation catalyst to yield 3-amino-4-hydroxy - 7α - 2-O-acyl-3-O-[5'-methyl-2'-pyrrol]-noviosyloxy-8-methyl coumarin, and
(f) reacting the latter compound with 2,4-dihalocarbonyl-3-methyl pyrrole wherein halo is selected from the group consisting of chlorine and bromine to give N,N'-bis{4-hydroxy - 8 - methyl-7-[4-O-methyl-5,5-dimethyl-3-O-(5'-methyl-2'-pyrrol)-L-lyxopyranosyloxy]-2-oxo-2H - 1 - benzopyran-3-yl}-3-methyl-2,4-pyrroledicarboxamide.

19. A process according to claim 18 wherein the acyl group is acetyl.

20. A member selected from the group consisting of an acidic compound of the formula

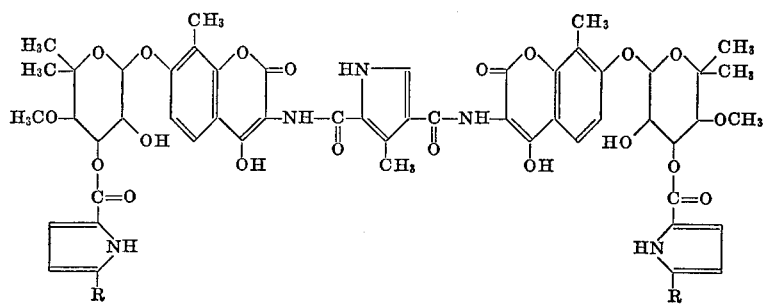

wherein R is a member selected from the group consisting of hydrogen and methyl and both R groups are alike; and nontoxic, pharmaceutically acceptable cationic salts thereof.

21. The compound of the formula

23. A nontoxic, pharmaceutically acceptable cationic salt of the compound of claim 21.

24. A nontoxic, pharmaceutically acceptable cationic salt of the compound of claim 22.

25. The sodium salt of the compound of claim 22.

26. The compound of claim 22 in substantially pure, solid form.

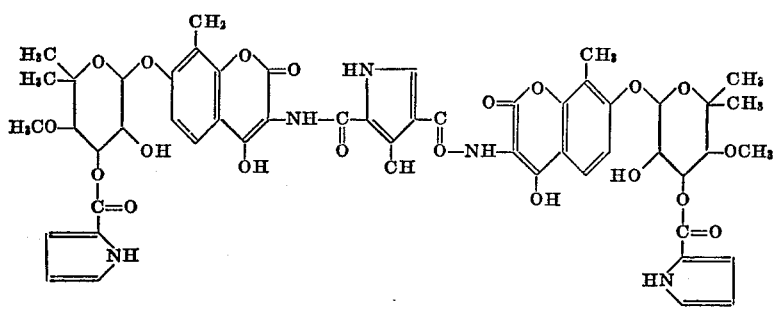

22. The compound of the formula

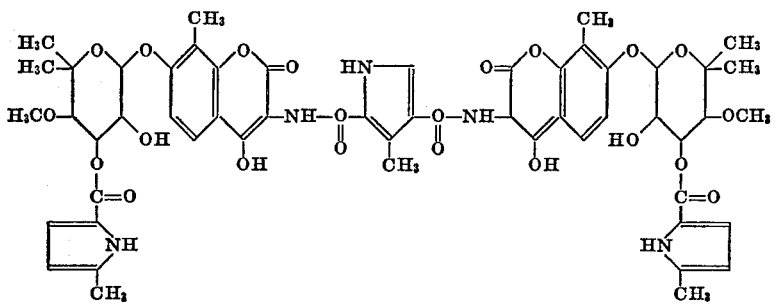

References Cited

UNITED STATES PATENTS

| | | | |
|---|---|---|---|
| 2,664,419 | 12/1953 | Lott et al. | 260—210 |
| 2,868,779 | 1/1959 | Bartels | 260—210 |
| 2,656,300 | 10/1953 | McCormack et al. | 195—80 |
| 2,931,756 | 4/1960 | Nakazawa et al. | 195—80 |
| 3,049,551 | 8/1962 | Walton et al. | 260—210 |
| 3,201,386 | 8/1965 | Kawnguchi et al. | 260—210 |

FOREIGN PATENTS

| | | | |
|---|---|---|---|
| 902,807 | 2/1961 | Great Britain | 260—210 |

LEWIS GOTTS, Primary Examiner

J. R. BROWN, Assistant Examiner

U.S. Cl. X.R.

195—80; 260—210, AB; 424—180